United States Patent
Akselrod et al.

(10) Patent No.: US 11,222,289 B2
(45) Date of Patent: Jan. 11, 2022

(54) ROUTE CALCULATIONS WITH DRIVE-THROUGH WAIT TIMES

(71) Applicant: International Business Machines Corporation, Armonk, NY (US)

(72) Inventors: Ben Z. Akselrod, Shefayim (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 15/793,381

(22) Filed: Oct. 25, 2017

(65) Prior Publication Data

US 2019/0122148 A1   Apr. 25, 2019

(51) Int. Cl.
*G01C 21/34* (2006.01)
*G06Q 10/04* (2012.01)
*G01C 21/00* (2006.01)
*G06Q 50/12* (2012.01)

(52) U.S. Cl.
CPC ......... *G06Q 10/047* (2013.01); *G01C 21/005* (2013.01); *G01C 21/343* (2013.01); *G06Q 50/12* (2013.01)

(58) Field of Classification Search
USPC .......................................................... 705/15
See application file for complete search history.

(56) References Cited

U.S. PATENT DOCUMENTS

| 2,951,642 | A | * | 9/1960 | Hazard | F25D 3/06 237/43 |
|---|---|---|---|---|---|
| 2004/0243301 | A1 | | 12/2004 | Kim | |
| 2006/0006025 | A1 | | 1/2006 | Dev et al. | |
| 2010/0174474 | A1 | | 7/2010 | Nagase | |
| 2016/0314482 | A1 | * | 10/2016 | Basu | G06Q 30/0251 |
| 2016/0363450 | A1 | | 12/2016 | Sahay et al. | |
| 2017/0336221 | A1 | * | 11/2017 | Salowitz | G06Q 10/047 |
| 2018/0114262 | A1 | * | 4/2018 | Sanjeevaiah Krishnaiah | G06Q 30/0631 |

OTHER PUBLICATIONS

Maria Salonen et al., "Modelling travel time in urban networks: comparable measures for private car and public transport", vol. 31, Jul. 2013, 21 pages.
Google Traffic, Wikipedia, https://en.wikipedia.org/wiki/Google_Traffic, Aug. 8, 2017, 4 pages.

* cited by examiner

*Primary Examiner* — Peter Ludwig
*Assistant Examiner* — Reva R Moore
(74) *Attorney, Agent, or Firm* — Maeve M. Carpenter; Maxine L. Barasch; Keohane & D'Alessandro, PLLC

(57) ABSTRACT

Disclosed embodiments provide techniques for incorporating drive-through wait times into a route calculation. A user often wishes to stop by a drive-through facility on their way to a final destination such as home or work. Disclosed embodiments factor the estimated wait time at the drive-through in determining an optimal travel route. The route is optimized for travel time based on received drive-through criteria.

14 Claims, 13 Drawing Sheets

ROUTE CALCULATIONS WITH DRIVE-THROUGH WAIT TIMES

FIELD OF INVENTION

Disclosed embodiments are related to navigation systems, and more particular, to navigation systems that provide route calculation with drive-through wait times.

BACKGROUND

Satellite navigation systems have been available in vehicles for a number of years. Modern satellite navigation systems can provide features beyond simple routing. Databases with points of interest such as restaurants, hotels, and attractions allow users to find such locations with relative ease. As millions of people continue to explore new locations by automobile, there exists a need for improvements in navigation systems.

SUMMARY

In one aspect, there is provided a computer-implemented method for factoring drive-through wait times in a navigation system to optimize a travel route, the computer-implemented method comprising: receiving a final destination; receiving drive-through criteria for an intermediate location; identifying a set of drive-through facilities that meet the received drive-through criteria; obtaining an estimated wait time for each drive-through facility in the set of drive-through facilities; responsive to receiving the final destination and the drive-through criteria, generating a proposed route that passes along at least one drive-through facility from the set of drive-through facilities; and generating an optimized route based on the final destination, the drive-through criteria, and the estimated wait time of each drive-through facility in the set of drive-through facilities.

In another aspect, there is provided an electronic communication device comprising: a processor; a memory coupled to the processor, the memory containing instructions, that when executed by the processor, perform the steps of: receiving a final destination; receiving drive-through criteria for an intermediate location; identifying a set of drive-through facilities that meet the received drive-through criteria; obtaining an estimated wait time for each drive-through facility in the set of drive-through facilities; responsive to receiving the final destination and the drive-through criteria, generating a proposed route that passes along at least one drive-through facility from the set of drive-through facilities; and generating an optimized route based on the final destination, the drive-through criteria, and the estimated wait time of each drive-through facility in the set of drive-through facilities.

In yet another aspect, there is provided a computer program product for factoring drive-through wait times to optimize a travel route, for an electronic computing device comprising a computer readable storage medium having program instructions embodied therewith, the program instructions executable by a processor to cause the electronic computing device to: create a web conference amongst a plurality of participants with a first presentation corresponding to a first participant in a live presentation mode; receive a final destination; receive drive-through criteria for an intermediate location; identify a set of drive-through facilities that meet the received drive-through criteria; obtain an estimated wait time for each drive-through facility in the set of drive-through facilities; responsive to receiving the final destination and the drive-through criteria, generate a proposed route that passes along at least one drive-through facility from the set of drive-through facilities; and generate an optimized route based on the final destination, the drive-through criteria, and the estimated wait time of each drive-through facility in the set of drive-through facilities.

BRIEF DESCRIPTION OF THE DRAWINGS

Features of the disclosed embodiments will be more readily understood from the following detailed description of the various aspects of the invention taken in conjunction with the accompanying drawings.

Figure 1:
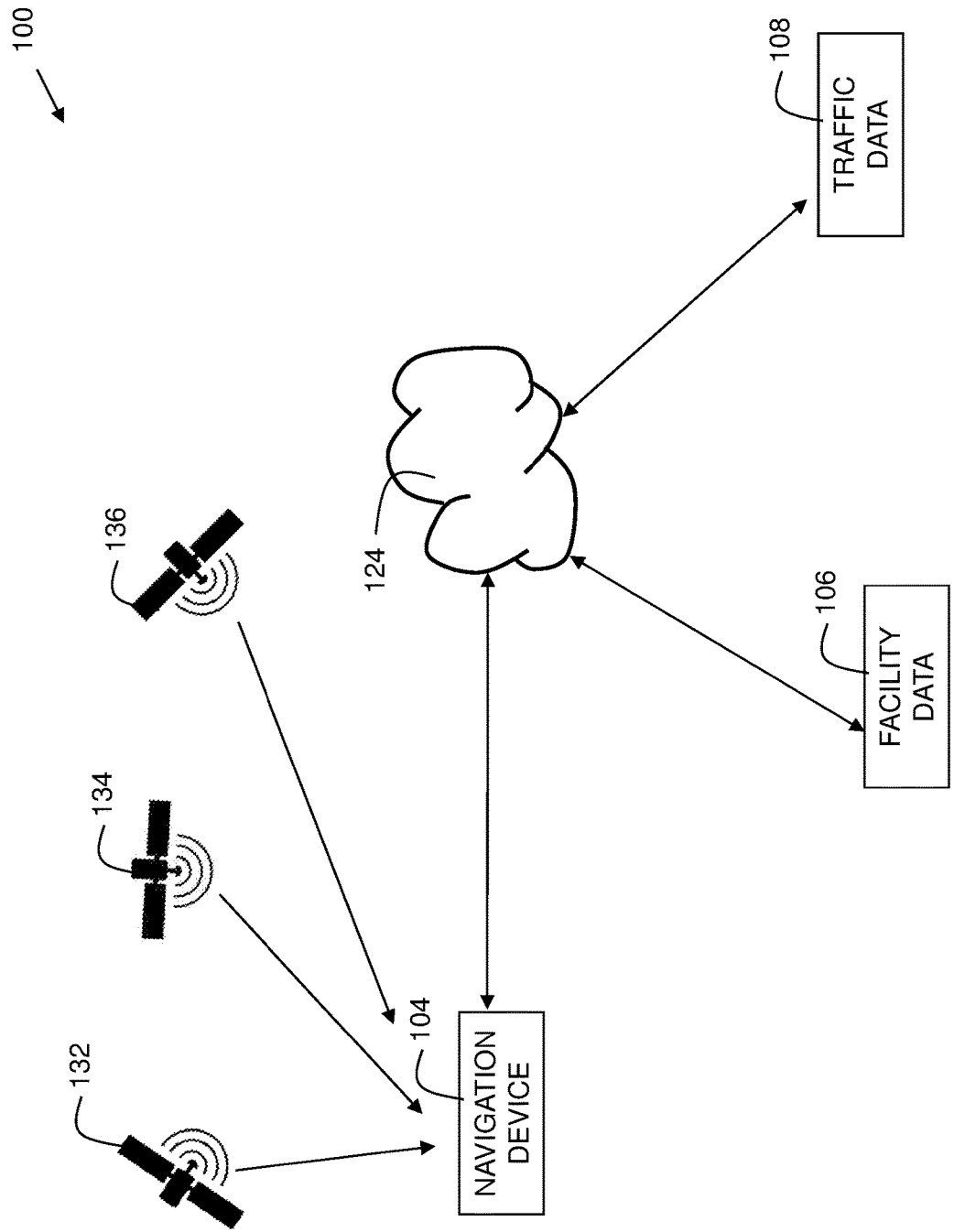
FIG. 1 shows a block diagram of an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for incorporating drive-through wait times into a route calculation. Many people's lives are very busy managing work, children, hobbies, appointments, etc. It can be hard to fit eating or drinking into busy schedules. Sometimes a person has to stop for takeout in order to have a meal or a snack. Many times, it is not clear as to how to access such food in the most efficient way. Accordingly, there exists a need for improvement in mapping technology. A user often wishes to stop by a drive-through facility on their way to a final destination such as home or work. Disclosed embodiments factor the estimated wait time at the drive-through in determining an optimal travel route. The route is optimized for travel time based on received drive-through criteria.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

A "drive-through" is a part of an establishment where a person can drive in and order, pay, and receive consumable products such as food or drinks while in their car. The user may order using a large tablet menu computer or via a microphone to a person inside the establishment who manually places the order. In some embodiments, the user pays and collects their food from a person through a window in the building. In other embodiments, the food is brought out to the user while in their parked vehicle. Drive-through facilities are a convenient way to get food or drinks since the person does not have to get out of their car during the process of ordering, paying, and receiving their food/drinks.

FIG. 1 shows a block diagram 100 of an environment for embodiments of the present invention. Navigation device 104 is in communication with network 124. Navigation device 104 may include a satellite-based navigation system, or other suitable navigation system. Navigation device 104 may be a standalone navigation system, or may be integrated into a mobile electronic device such as a smartphone or tablet computer. Network 124 can be the Internet, a wide area network, a cellular network, or other suitable system. Satellites 132, 134, and 136 are orbiting the earth and sending out signals that can be received by navigation device 104. Although three satellites are shown, in some embodiments, more or fewer may be included.

Facility data storage device 106, also in communication with network 124, receives and stores information from and about establishments having drive-through facilities. The data may include information about wait times. In some embodiments, the wait time information may comprise wait time derived from historical data. The data may include historical averages for particular days of the week, particular times of the day, or particular times of the year. In some embodiments, the wait time information may comprise real-time wait-time data. The data could be reported by the restaurant through a web service (like software as a service). The data could be crowdsourced from various people, using an app., in real time. The data could be collected by video surveillance of the traffic in various drive-through facilities. The data could be collected using surveilling drones at various drive-through facilities.

Traffic data storage system 108, in communication with network 124 receives, calculates, and stores traffic data. Traffic data may include, for example, speed of traffic, accidents, road work, obstructions, etc. The data could be compiled from news reports. The data could be collected from satellite feeds. The data could be crowdsourced from various people, using an application (app), in real time. The data could be collected by video surveillance of the traffic in various locations. The data could be collected using surveilling drones at various locations.

Figure 2:
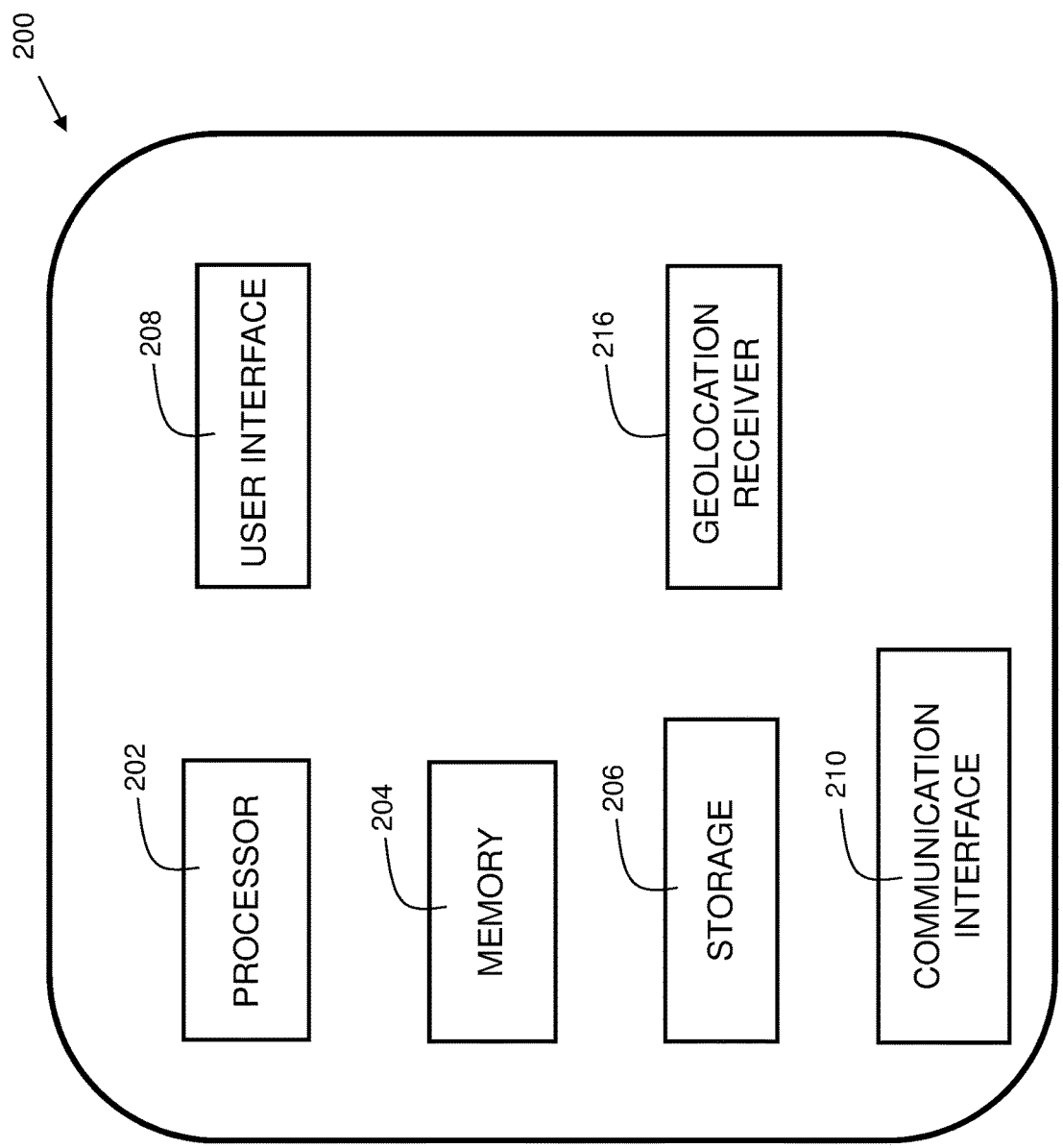
FIG. 2 is a block diagram of a device in accordance with embodiments of the present invention.

FIG. 2 is a block diagram of a navigation device (e.g. 104 of FIG. 1) in accordance with embodiments of the present invention. Device 200 is shown as a simplified diagram of modules. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments.

The device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

The device 200 further includes a geolocation receiver 216. Geolocation receiver 216 can include one or more of GPS, Galileo, GLONASS, or other system now known or hereafter developed.

In some embodiments, the device 200 is a smartphone, tablet computer, or other suitable (portable/mobile) device.

Figure 3:
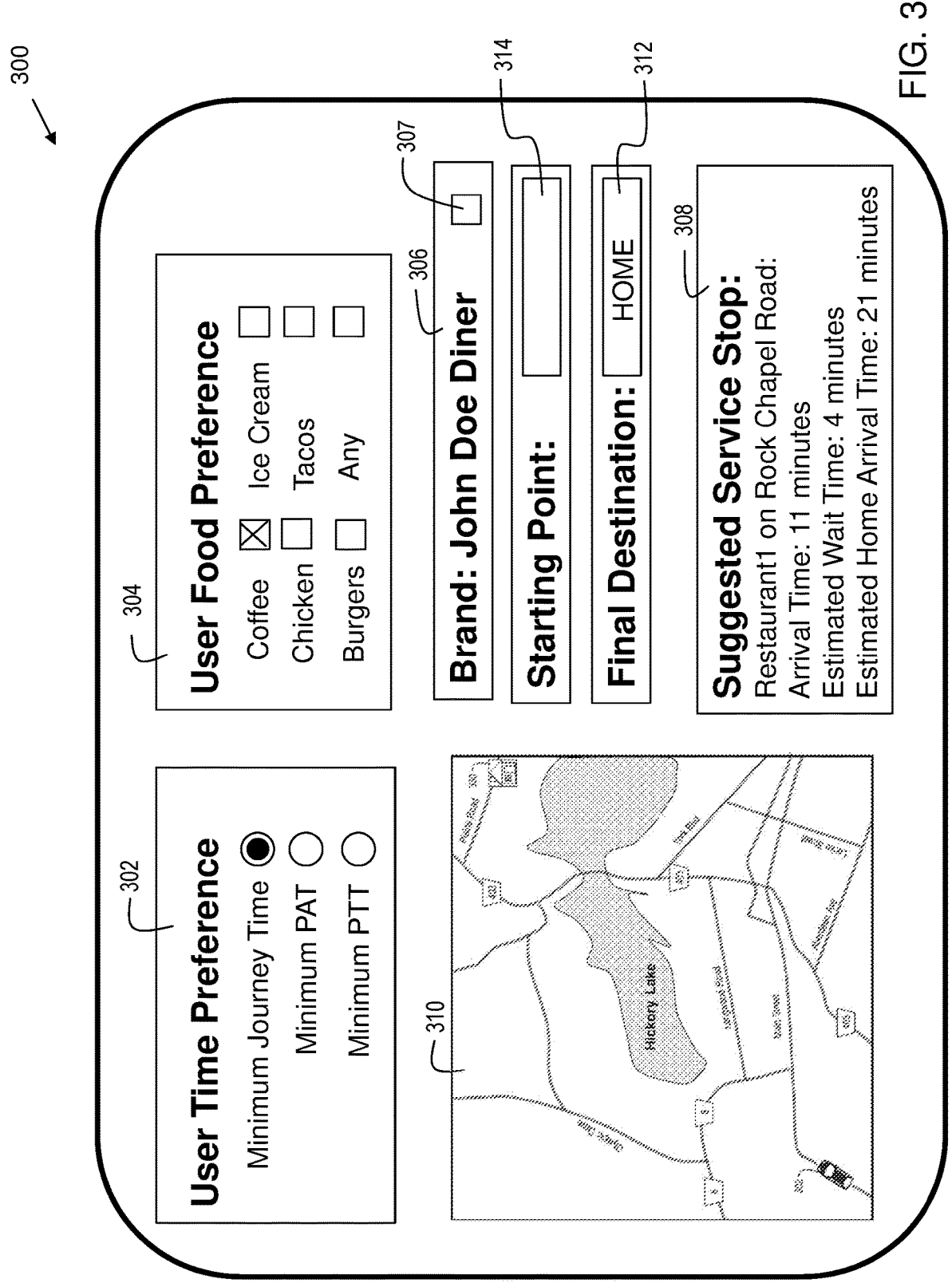
FIG. 3 is an exemplary user interface for an embodiment of the present invention.

FIG. 3 is an exemplary user interface 300 for an embodiment of the present invention. Embodiments provide a computer-implemented method for factoring drive-through wait times to optimize a travel route. A final destination is received, typically entered by the user. Drive-through criteria for an intermediate location is also received from the user. The final destination and the criteria may be received into a user interface. In the example, user interface 300 includes options for user selection. User time preference menu 302 is shown with three example options each having a corresponding radio button: minimum journey time, minimum product acquisition time (PAT), and minimum product transit time (PTT). In some embodiments, more, fewer, or different options may be included in menu 302.

Minimum journey time means the shortest time to get to the final destination. This includes the transit time from the starting point to the drive-through, the wait time at the drive-through (including time in line, ordering, paying for, and collecting consumable products), and the transit time from the drive-through to the final destination.

Product Acquisition Time (PAT) is the current time (where the user is currently) to when the consumable products (food and/or beverages) are picked up. The user can choose a preference of minimizing PAT, with wait-time as a secondary factor. The user might be extremely hungry or thirsty so s/he is more concerned with getting his/her food quickly than getting to the final destination in the most expedient time.

Product transit time (PTT) is the time from when the consumable products are picked up to the time of arrival at the final destination. The user can choose a preference of minimizing PTT, with wait time as a secondary factor. For example, the user might want his/her food to be hot or still frozen when s/he eats it so s/he is more concerned with getting his/her food quickly to the final destination than getting through the drive-through in the most expedient time.

In embodiments, receiving drive-through criteria includes receiving a consumable product category, such as a food or beverage. User food preference menu 304 is shown having example options, each having a corresponding check box: coffee, chicken, burgers, ice cream, tacos, or any. In embodiments, more, fewer, or different options may be included in menu 304. Specific brand option 306 is shown allowing the user to check box 307 to choose food from a specific brand, which in the example is John Doe Diner. Although only one brand option is shown, in embodiments, more may be included. Map 310 is shown of the general area at issue. Map information may be collected from GPS, GLONASS, Galileo, or other system. Final destination field 312 is provided for entry of a name, address, or other information by which the coordinates of the user's destination can be located. Starting point field 314 is provided for entry of a name, address, or other information by which the coordinates of the user's starting point can be located. In some embodiments, the starting point is entered as current location, and a navigation system detects the device's (i.e., user's) coordinates.

In embodiments, more or fewer elements may be shown on user interface 300. It should be recognized that, in embodiments, user selection mechanisms including radio buttons, fields, check boxes, etc. can be replaced with any suitable mechanism and are not limited to those described here. Also, more, fewer, or different options may be included on the user interface as compared to user interface 300.

A set of drive-through facilities that meet the received drive-through criteria are identified. An estimated wait time for each drive-through facility in the set of drive-through facilities is obtained. Responsive to receiving the final destination and the drive-through criteria, a proposed route that passes along at least one drive-through facility from the set of drive-through facilities is generated. An optimized route is generated based on the final destination, the drive-through criteria, and the estimated wait time of each drive-through facility in the set of drive-through facilities. In the example, suggested service stop section 308 is shown, which includes the system's suggestion based on the user-selected criteria, calculations, and location.

In the example of FIG. 3, the user time preference of "minimum journey time" is selected as evidenced by the filled-in radio button. The consumable product preference of "coffee" is also selected, as evidenced by the check in the corresponding checkbox. A final destination of "home" is entered, which the system recognizes as the address previously associated by the user at an earlier time as "home" (in the example, the home address is 422 Plains Road). These selections indicate that the user wants to get to 422 Plains Road with a coffee in the minimum amount of total time (total drive time plus time of waiting at a drive-through facility). Accordingly, the system calculates a route to get the user home in the fastest amount of time while passing by an establishment with a drive-through that serves coffee. Based on the calculation, the system indicates a suggested service stop at section 308, of Restaurant) on Rock Chapel Road. As shown at section 308, the estimated arrival time at Restaurant) is eleven minutes, the estimated wait time at the drive-through is four minutes, and the estimated final destination (422 Plains Road) arrival time is 21 minutes (total of time to the drive-through, time at the drive-through, and time from the drive-through to home address).

In general, the minimum journey time can be expressed as:

$$T(C \rightarrow Ri) + W(Ri) + T(Ri \rightarrow D)$$

Where:

$T(C \rightarrow Ri)$ is the travel time from the current location to restaurant Ri;

$W(Ri)$ is the wait time at restaurant Ri; and $T(Ri \rightarrow D)$ is the travel time from restaurant Ri to the final destination D.

In embodiments, multiple restaurant locations may be used in the above computation, and the restaurant resulting in the minimum journey time is selected, and the corresponding route is displayed on an electronic navigation device. This expression of minimum journey time is an example. Any suitable computation is included within the scope of the invention.

Figure 4A:
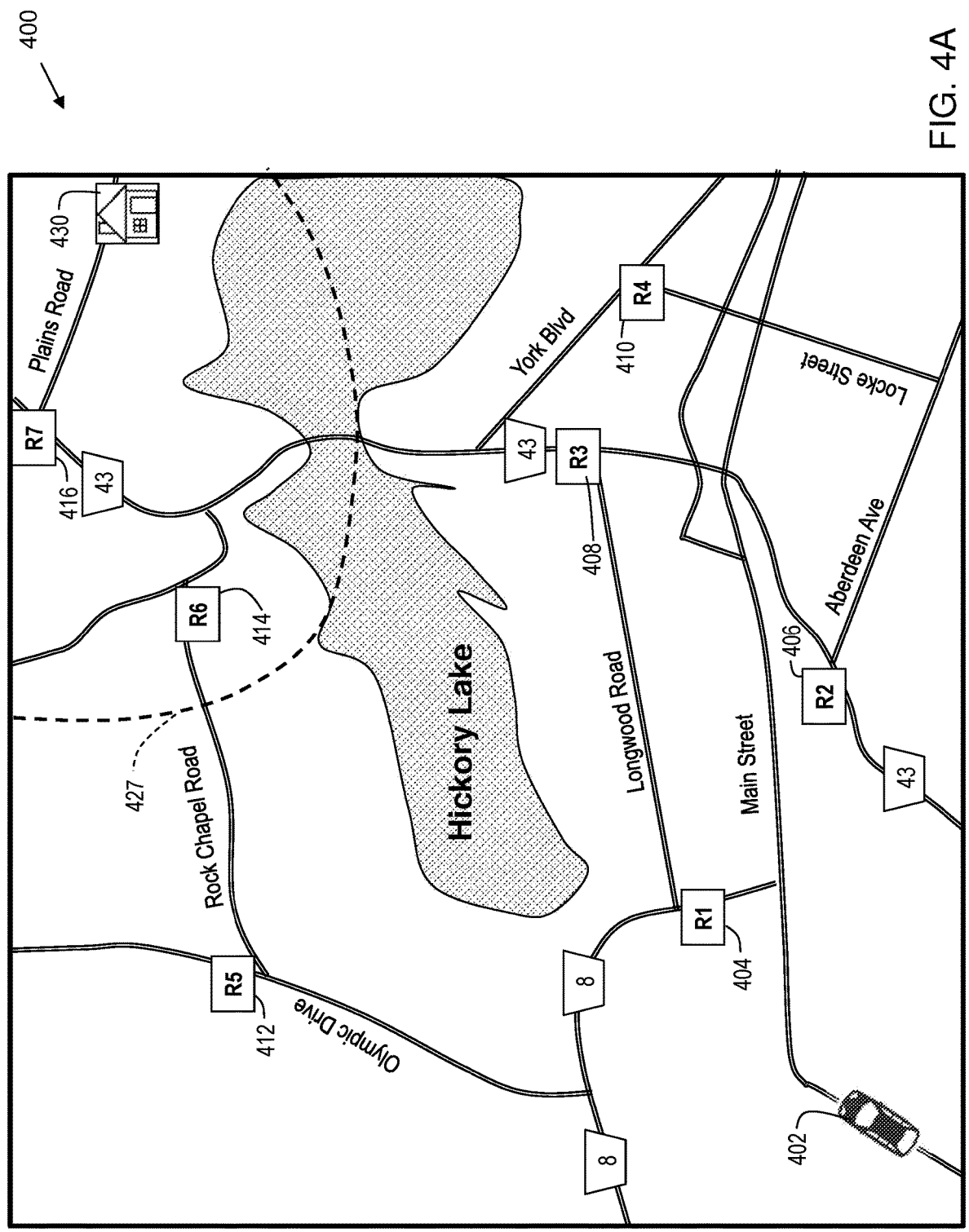
FIG. 4A is an exemplary map display in accordance with embodiments of the present invention.

FIG. 4A is an exemplary map display 400 in accordance with embodiments of the present invention. A user's current location is shown at 402. Several restaurants having drive-through facilities are shown on the map, including Restaurant1 ("R1" on the maps) 404, Restaurant2 ("R2" on the maps) 406, Restaurant3 ("R3" on the maps) 408, Resturant4 ("R4" on the maps) 410, Restaurant5 ("R5" on the maps) 412, Restaurant6 ("R6" on the maps) 414, and Restaurant7 ("R7" on the maps) 416. The user's home location is shown at 430. Region 427 is delineated around the user's home location 430 as "close" to the house. Such region includes Restaurant6 414 and Restaurant7 416. "Close" may be a set distance, for example, three miles from the destination, or in some embodiments, may be user defined.

Figure 4B:
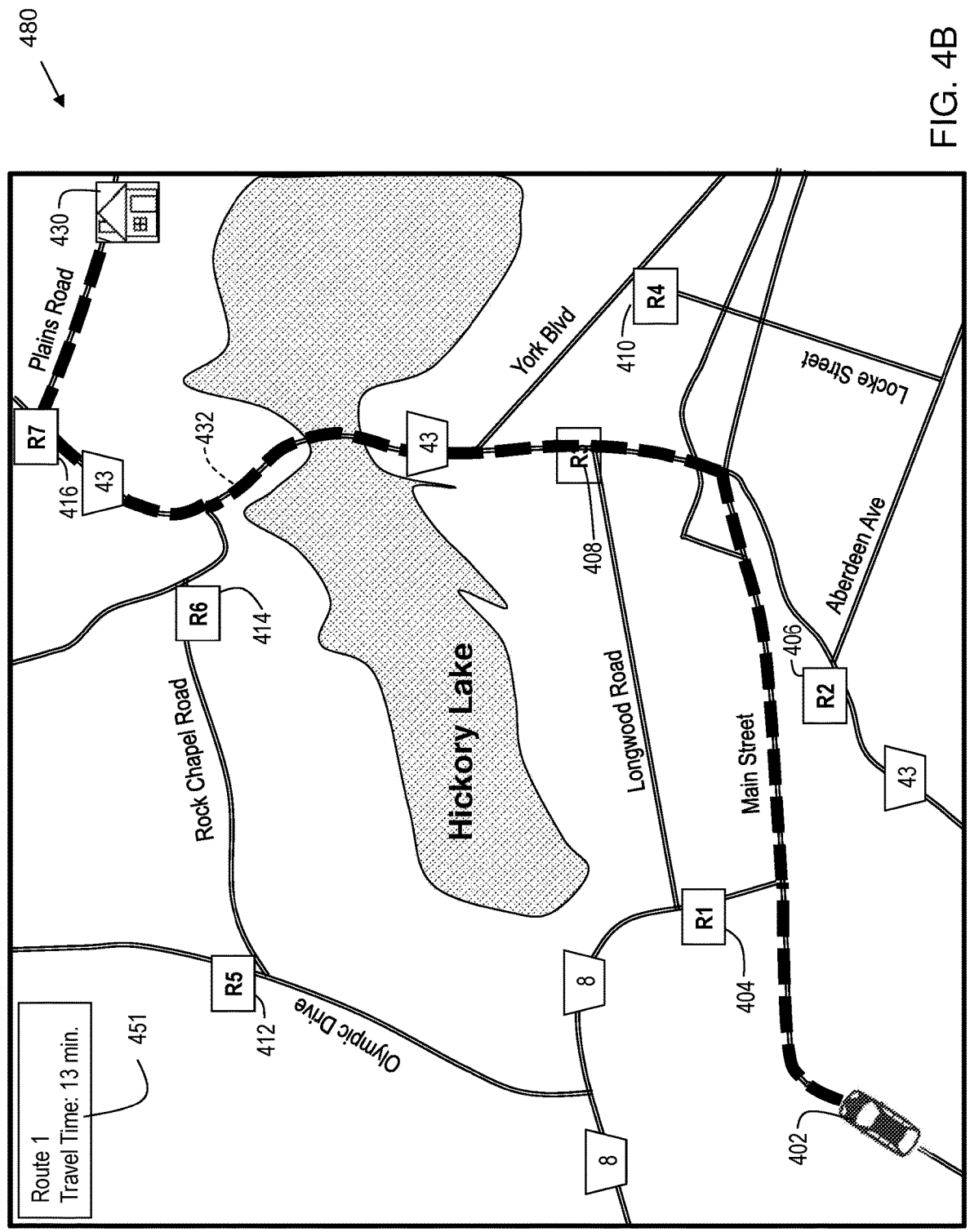
FIG. 4B shows an example of a first travel route to a destination.

FIG. 4B shows an exemplary map display 480 including an example of a first travel route to a destination. Travel route 432 is the visual depiction of the route calculated by the navigation device 104 (FIG. 1). In this example, the total travel time for the route 432 is thirteen minutes as indicated in information message 451.

Figure 4C:
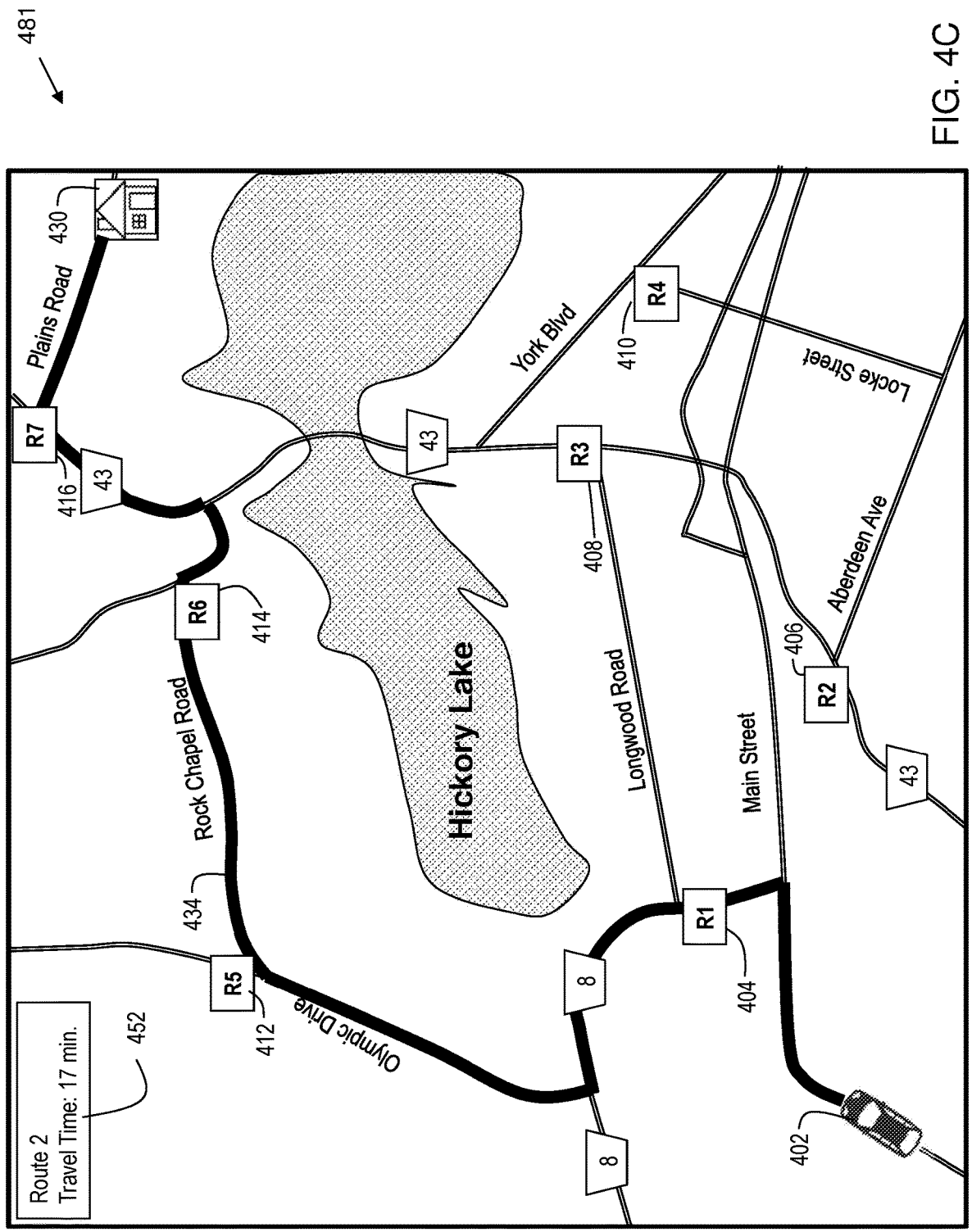
FIG. 4C shows an example of a second travel route to a destination.

FIG. 4C shows an exemplary map display 481 including an example of a second travel route to a destination. Travel route 434 is the visual depiction of the route calculated by the navigation device 104 (FIG. 1). In this example, the travel time for the second travel route 434 is 17 minutes as indicated in information message 452.

Figure 4D:
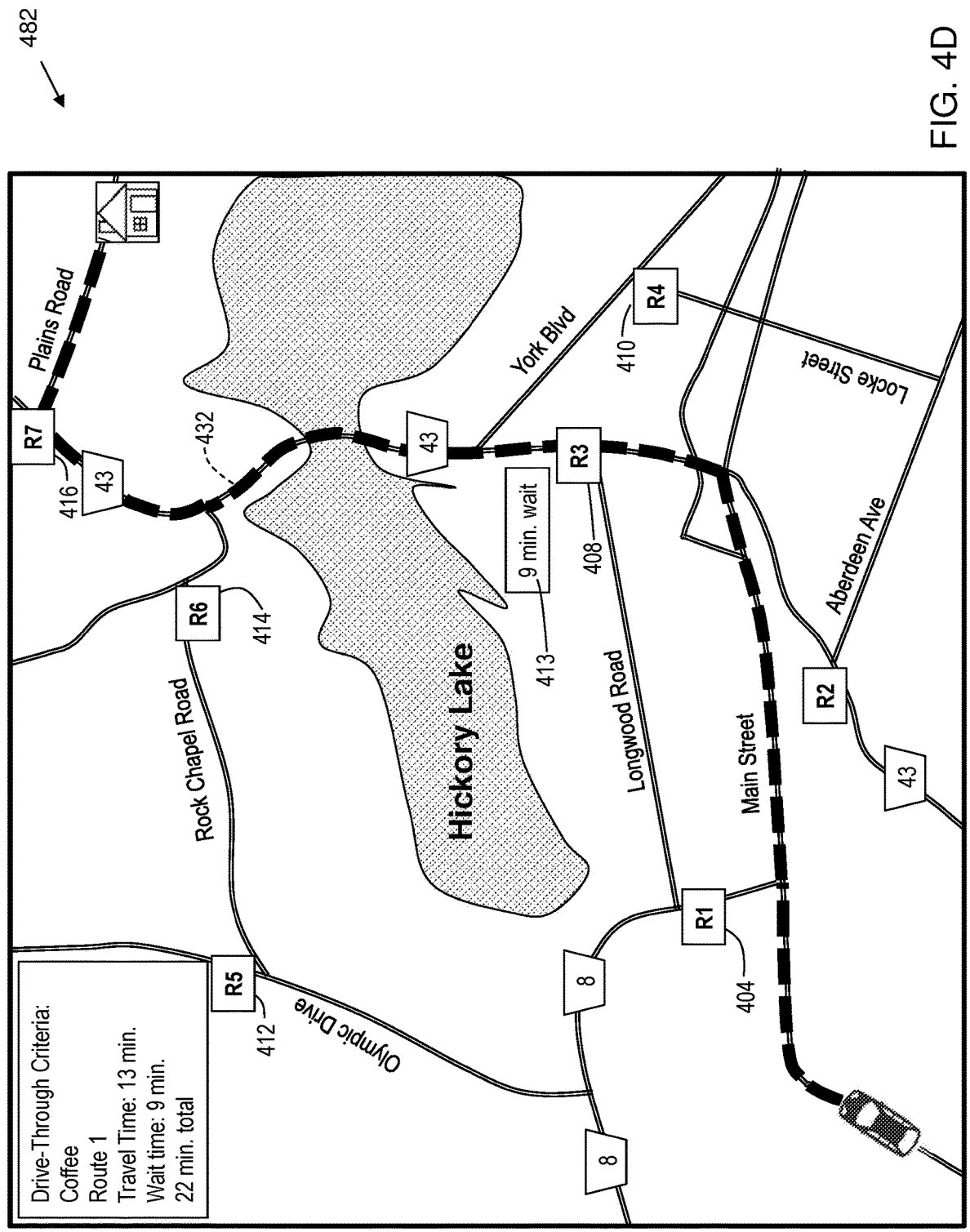
FIG. 4D shows travel time based on drive-through criteria for the first travel route.

FIG. 4D shows an exemplary map display 482 having an information message including travel time based on drive-through criteria for the first travel route. Map display 482 is similar to map display 480, but also includes the first travel route 432 and information message 413 including the total wait time.

Figure 4E:
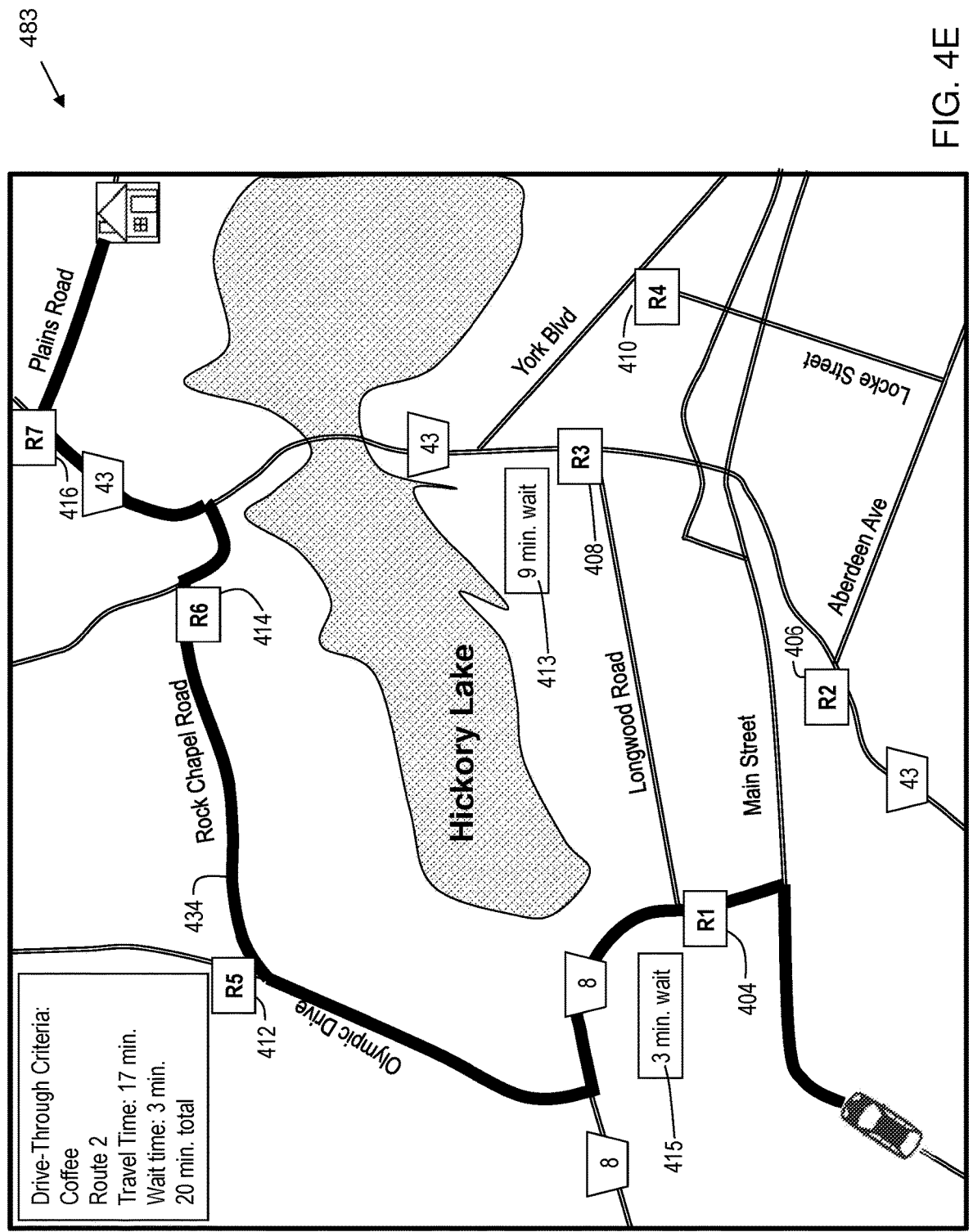
FIG. 4E shows travel time based on drive-through criteria for the second travel route.

FIG. 4E shows an exemplary map display 483 having an information message including travel time based on drive-through criteria for the second travel route. Map display 483 is similar to map display 481, but also includes the second travel route 434 and information message 415 including the total wait time. Even though the route 432 depicted in FIG. 4B has a shorter travel time than route 434 depicted in FIG. 4C, when drive-through criteria and current estimated drive-through wait times are considered, the route 434 of FIG. 4C has the shortest overall travel time. This is not always intuitive, and thus, disclosed embodiments can optimize the route for minimal travel time including drive-through wait times, thereby saving travel time and reducing fuel consumption. Disclosed embodiments provide improvements that can be utilized in navigation applications on mobile devices, as well as standalone navigation devices for use in vehicles.

Figure 4F:
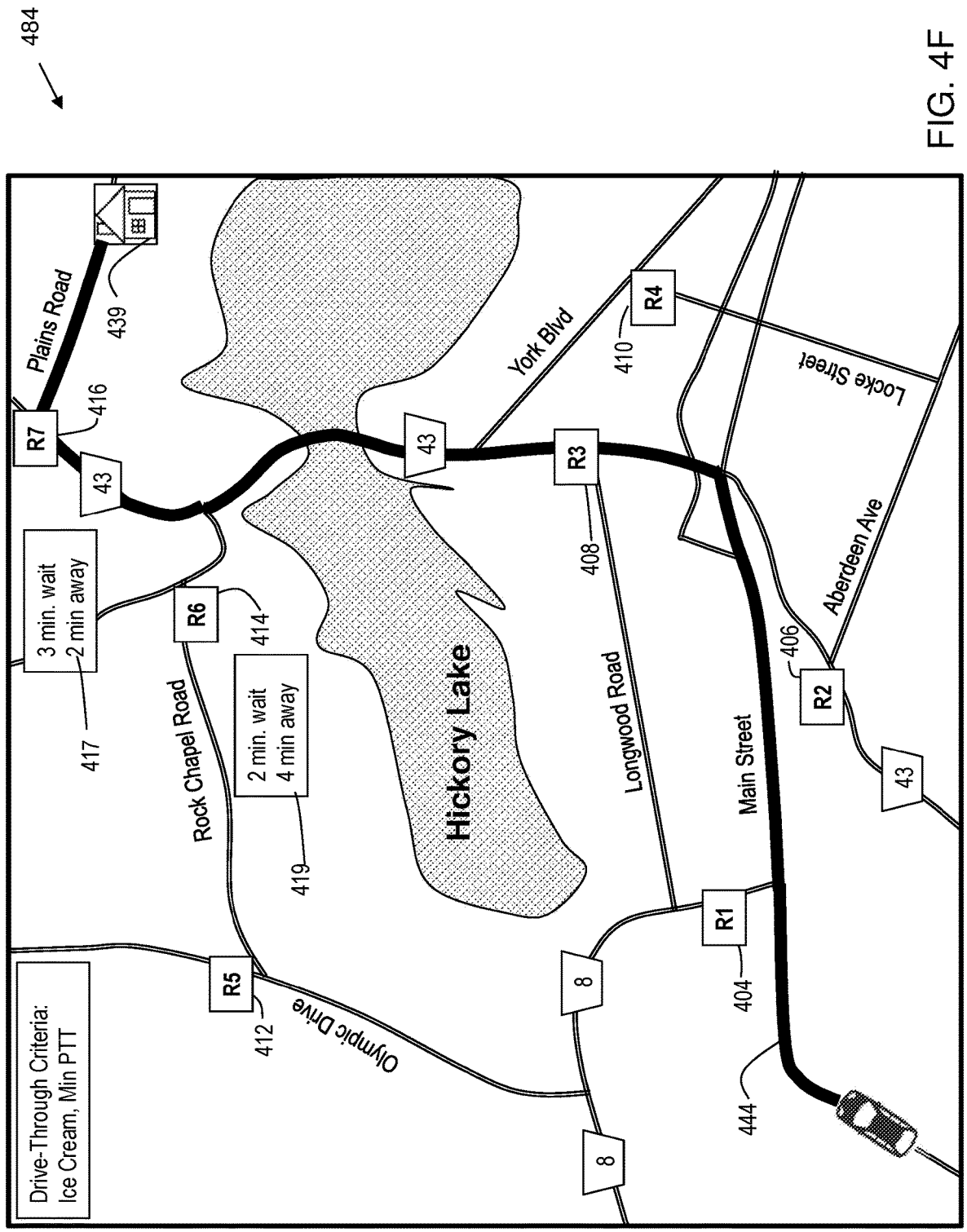
FIG. 4F shows a travel route for minimum product transit time.

FIG. 4F shows an exemplary map display 484 including an example of a travel route for minimum product transit time. Some embodiments include receiving drive-through criteria that includes receiving a product transit time preference. Product transit time (PTT) is the time from when the consumable product is picked up to the time of arrival at the final destination. The user can choose a preference of minimizing PTT, with wait time as a secondary factor. In the example, the user wants to pick up an ice cream and wants it to still be frozen when she gets home to eat it. Accordingly, she wants to give preference to a restaurant that is as close as possible to where she lives, but also consider wait times, so she is willing go out a little further for a place with no line, but still restricting the searching to a region close to the final destination. Thus, at display similar to 300 of FIG. 3, she selects "minimum PTT" as the user time preference, "ice cream" as the user consumable product preference, and "home" as the final destination. A Restaurant6 414 and a Restaurant7 416 are shown within a close range to her home. Information message 417 shows Restaurant7 416 has a three-minute wait and is two minutes from her home address 439. Information message 419 shows Restaurant6 414 has a two-minute wait and is four minutes from her home address 439. Therefore, the system presents route 444 which takes her to Restaurant7 416, since it will require the shortest amount of time to get home after consumable product pick up.

Figure 4G:
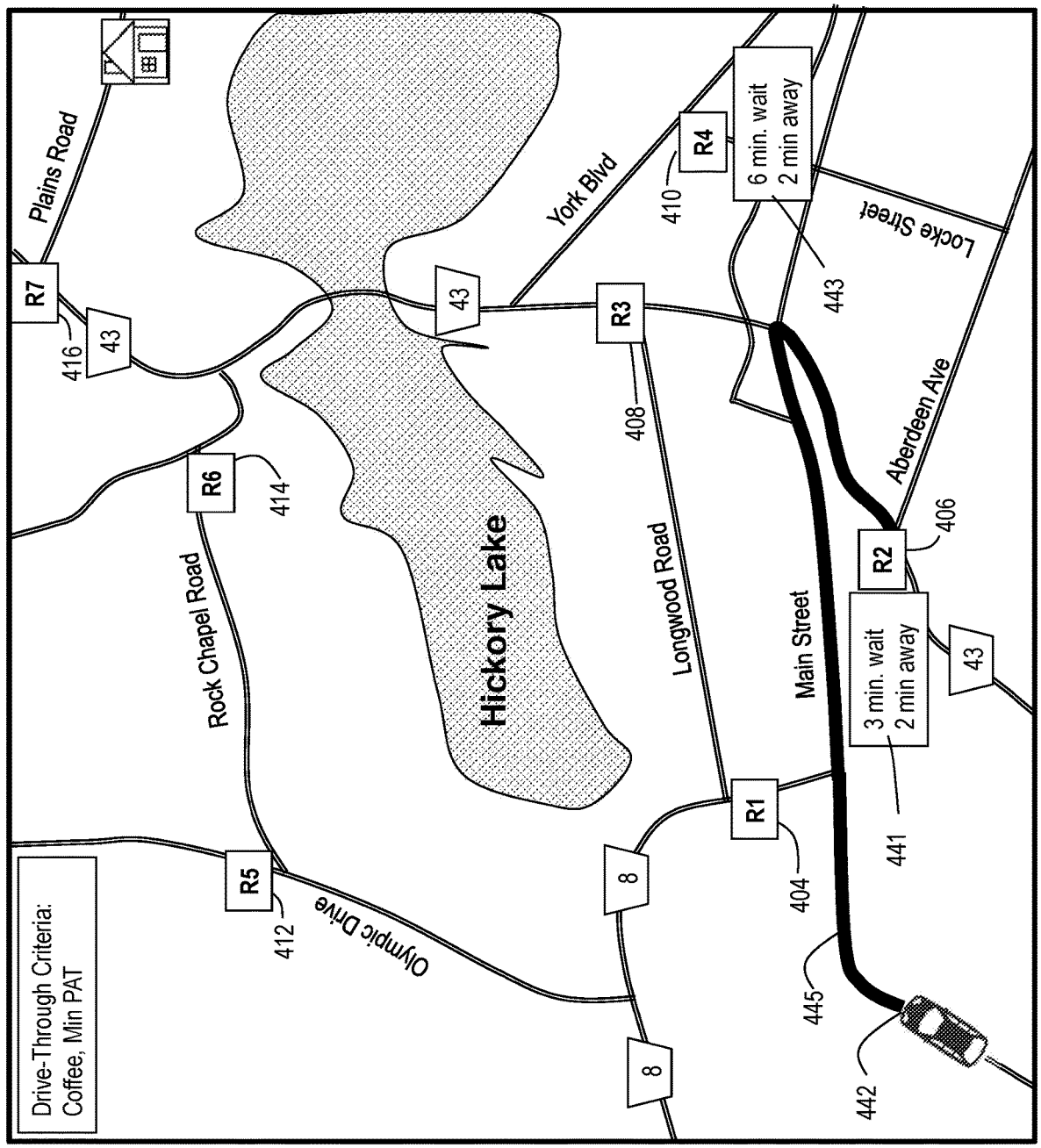
FIG. 4G shows a travel route for minimum product acquisition time.

FIG. 4G shows an exemplary map display 485 including an example of a travel route for minimum product acquisition time. In some embodiments, receiving drive-through criteria includes receiving a product acquisition time preference. Product acquisition time (PAT) is the time from the user's current location to the time the consumable products are picked up. The user can choose a preference of minimizing PAT, with wait time as a secondary factor. In the example, the user desperately wants a coffee, so he wants to get to the closest place, but also wants to factor in wait times so that the time required to actually get the coffee in his hands is minimized. Accordingly, he wants to give preference to a restaurant that is close to where he currently is, but also consider wait times, so is willing to go out a little further for a place with no line, but searching in a region close to where he currently is, while heading in the direction of his final destination. So, on user interface 300, he selects "minimum PAT," "coffee", and "home." A Restaurant4 410 and a Resturant2 406 are shown within a close range to his starting point. Information message 441 shows Restaurant2 406 has a three-minute wait and is two minutes from his starting point 442. Information message 443 shows Resturant4 has a six-minute wait and is two minutes from his starting point. Therefore, the system presents route 445 which takes him to Resturant2 406, since the time for acquiring the coffee will be shorter than at Restaurant4 410.

Figure 5:
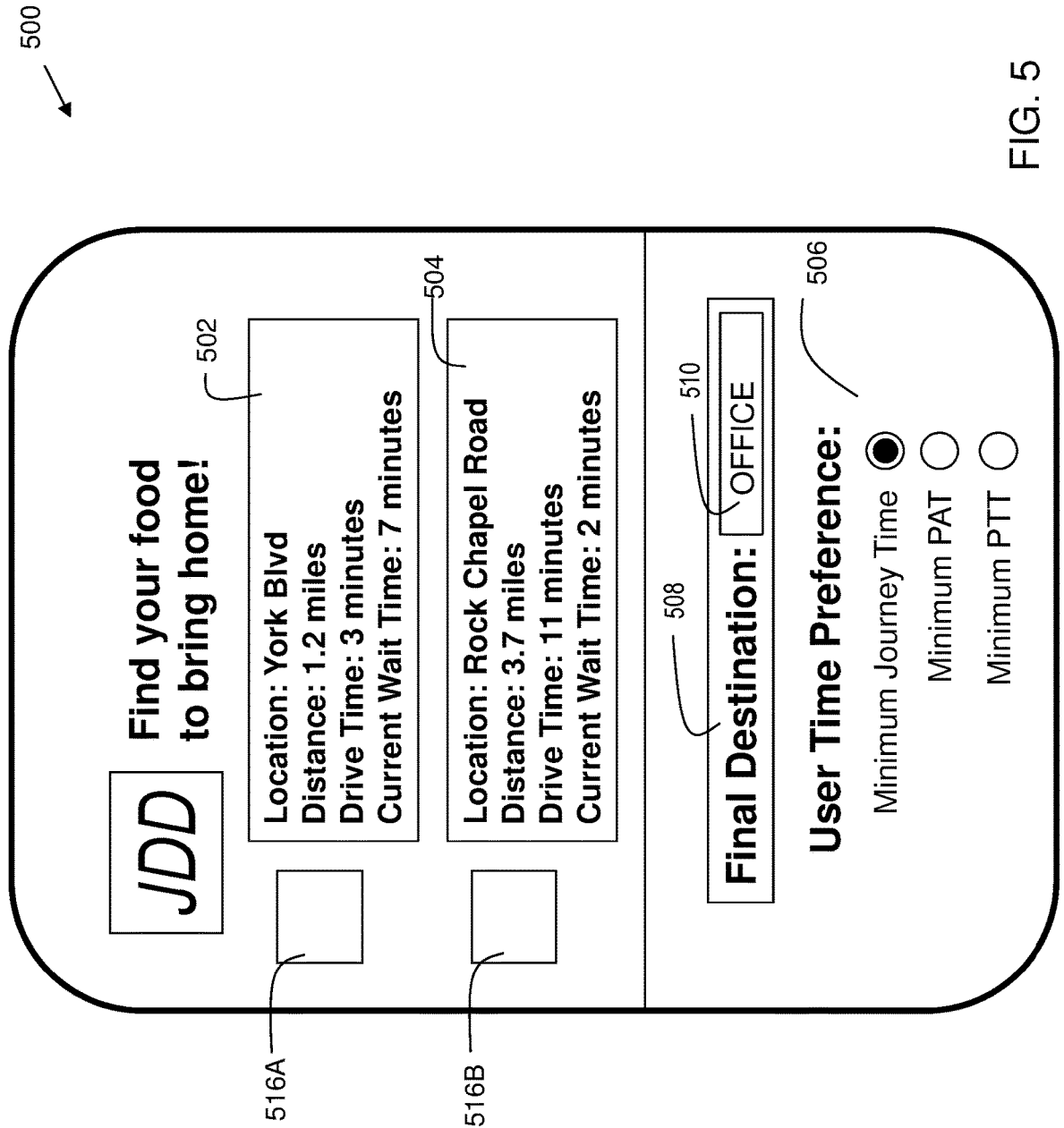
FIG. 5 is an exemplary user interface for an alternative embodiment of the present invention.

FIG. 5 is an exemplary user interface 500 for an alternative embodiment of the present invention. In some embodiments, receiving drive-through criteria includes receiving a brand name. In some embodiments, the search is restricted to a particular brand name. For example, the user can select such on the user interface 300 (FIG. 3) at 306. In other embodiments, the invention is embodied as an application (software) wherein a single brand or family of brands (one parent company may have three brands) of drive-through establishments is available to search. On user interface 500, the brand is "JDD" (John Doe Diner from FIG. 3). At 506, there is provided a menu where search criteria can be received from a user. Three options are provided for user time preference: minimum journey time, minimum PAT, and minimum PTT. At 508, the user can enter a final destination into field 510. In the example, minimum journey time and "office," is entered. The starting point can be detected from a navigation system, or in some embodiments, can also be entered to a field in the user interface such as 314 of FIG. 300. The system generates travel routes based on the criteria. In the example, two matches 502 and 504 are found from which the user can select, by clicking box 516A or 516B. In other embodiments, the closest match is automatically selected and presented to the user.

In embodiments, more or fewer elements may be shown on user interface 500. It should be recognized that, in embodiments, user selection mechanisms including radio buttons, fields, check boxes, etc. can be replaced with any suitable mechanism and are not limited to those described here. Also, more, fewer, or different options may be included on the user interface as compared to user interface 500.

Figure 6:
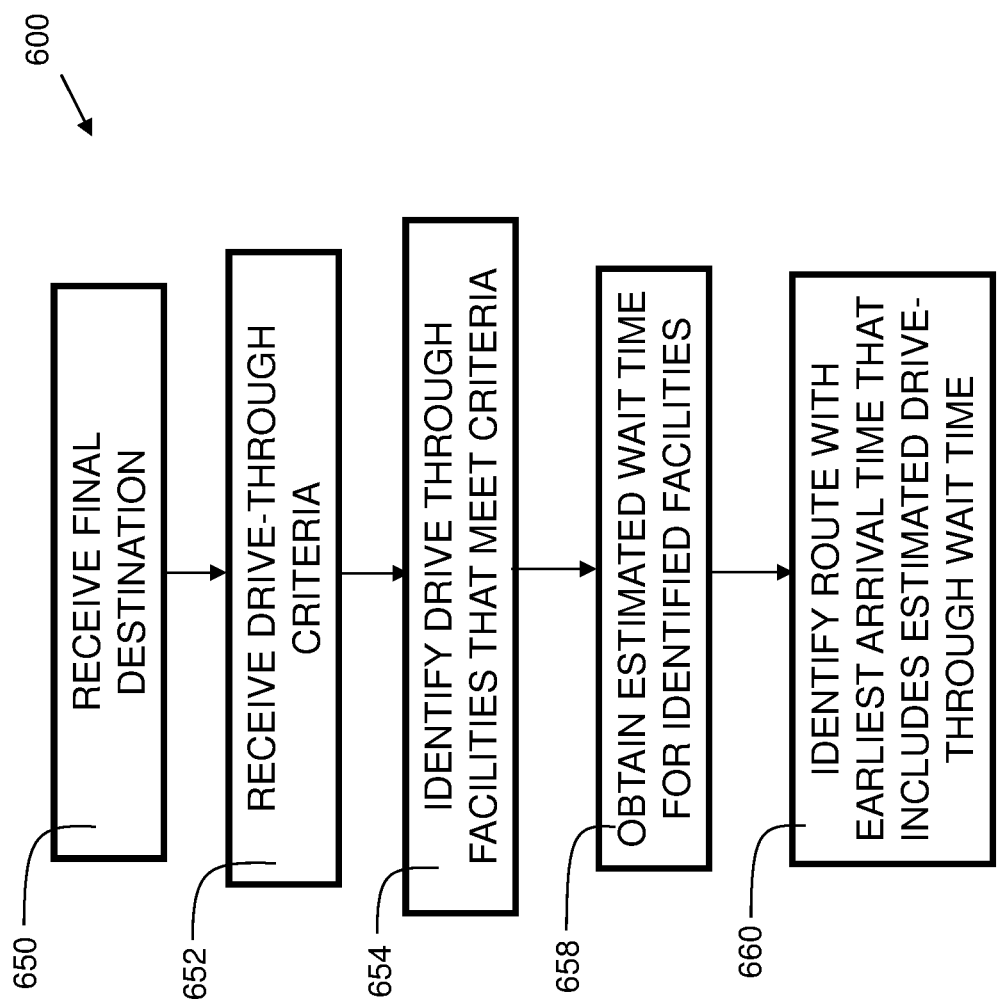
FIG. 6 is a flowchart indicating process steps for embodiments of the present invention.

FIG. 6 is a flowchart 600 indicating process steps for embodiments of the present invention. A final destination is received, at 650. This is the destination where the user is trying to get to at the end of the trip. Drive-through criteria is received, at 652. Drive-through facilities that meet the criteria are identified, at 654. Estimated wait times are obtained for identified facilities, at 658. A route with earliest arrival time that includes estimated drive-through wait time is identified, at 660.

Figure 7:
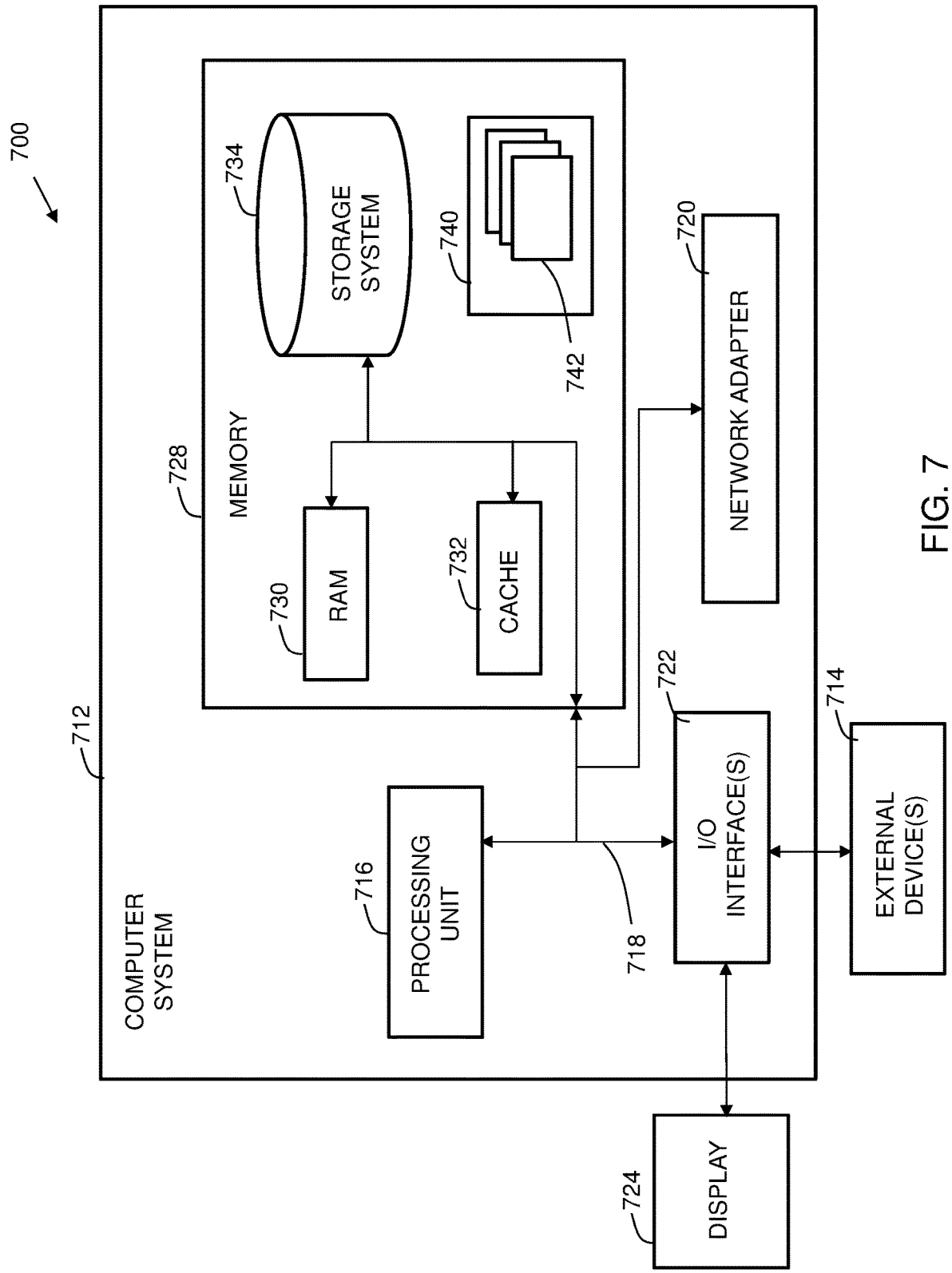
FIG. 7 shows additional details of an embodiment of the present invention.

Referring now to FIG. 7, a computerized implementation 700 of an embodiment for automated user interface analysis is described in further detail. Computerized implementation 700 is only one example of a suitable implementation and is not intended to suggest any limitation as to the scope of use or functionality of embodiments of the invention described herein. Regardless, computerized implementation 700 is capable of being implemented and/or performing any of the functionality set forth hereinabove.

In computerized implementation 700, there is a computer system 712. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 712 is intended to demonstrate that some or all of the components of implementation 700 could be deployed, managed, serviced, etc., by a service provider who offers to implement, deploy, and/or perform the functions of the present invention for others.

Computer system 712 is intended to represent any type of computer system that may be implemented in deploying/realizing the teachings recited herein. Computer system 712 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 712 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software, but can perform similar functions.

Computer system 712 in computerized implementation 700 is shown in the form of a general-purpose computing device. The components of computer system 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 716 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 716 collects and routes signals representing inputs and outputs between external devices 714 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 716 executes computer program code, such as program code for gathering time-annotated web interaction and biometric sensor data of web page users to extrapolate emotional responses to a web page and generating an aggregated emotional map indicative of the emotional responses, which is stored in memory 728, storage system 734, and/or program/utility 740. While executing computer program code, processing unit 716 can read and/or write data to/from memory 728, storage system 734, and program/utility 740.

Computer system 712 typically includes a variety of computer system readable media. Such media may be any available media that is accessible by computer system 712, and it includes both volatile and non-volatile media, removable and non-removable media.

System memory 728 can include computer system readable media in the form of volatile memory, such as random access memory (RAM) 730 and/or cache memory 732. Computer system 712 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 740, having a set (at least one) of program modules 742, may be stored in memory 728 by way of example, and not limitation. Memory 728 may also have an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system 712 may also communicate with one or more external devices 714 such as a keyboard, a pointing device, a display 724, etc.; one or more devices that enable a consumer to interact with computer system 712; and/or any devices (e.g., network card, modem, etc.) that enable computer system 712 to communicate with one or more other computing devices. Such communication can occur via I/O interfaces 722. Still yet, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples include, but are not limited to: microcode, device drivers, redundant processing units, external disk drive arrays, RAID systems, tape drives, and data archival storage systems, etc.

In some embodiments, multiple criteria can be submitted. For example, a user may specify multiple food types (e.g., tacos and hamburgers), and embodiments may perform computations for both taco restaurants and hamburger restaurants, and provide a route with a minimal optimal time for making a stop at two restaurants. In some embodiments a user may specify multiple criteria by specifying multiple brand names of restaurants at which to stop. In embodiments, a route can be optimized for two or more different stops along the way to a final destination. Embodiments are not limited to consumable products. In some embodiments, wait-times for various services, such as vehicle oil changes, automated teller access, banking, and/or other services may be factored into calculations of routes in accordance with embodiments of the present invention.

As can now be appreciated, disclosed embodiments provide an improvement to navigation systems. Disclosed embodiments allow a user to input a variety of criteria regarding a consumable product category, such as a food or beverage that the user desired. Drive-throughs that fit the user specified criteria along possible routes are identified. The estimated drive-through wait time is factored into the overall arrival time estimates. By factoring in drive-through wait times into route calculations, overall travel time can be saved, resulting in reduced fuel consumption, reduced travel time, and increased productivity.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for factoring drive-through wait times in a navigation system to optimize a travel route, the computer-implemented method comprising:
presenting a menu comprising an option corresponding to a minimum journey time, an option corresponding to a minimum product acquisition time, and an option corresponding to a minimum product transit time;
receiving a selection of the option corresponding to the minimum product transit time;
receiving a selection, of the option corresponding to the minimum product acquisition time, as a secondary factor;
receiving a final destination;

receiving drive-through criteria for an intermediate location, wherein the drive-through criteria includes selection of a consumable product;
identifying a plurality of drive-through facilities that meet the received drive-through criteria;
obtaining an estimated wait time for each drive-through facility in the set of drive-through facilities using real-time wait-time data crowdsourced from customers of each drive-through facility; and
responsive to receiving the final destination and the drive-through criteria, generating an optimized route that passes along a drive through facility, selected from the plurality of drive-through facilities, that minimizes a time from when a consumable product is picked up to a time of arrival at the final destination based on the final destination, the drive-through criteria, and the estimated wait time of each drive-through facility in the set of drive-through facilities, such that a temperature variance of the consumable product between the time from when the consumable product is picked up to the time of arrival at the final destination is minimized.

2. The method of claim 1, wherein receiving drive-through criteria includes receiving a brand name.

3. The method of claim 1, wherein receiving drive-through criteria includes receiving a consumable product category.

4. The method of claim 1,
wherein receiving drive-through criteria includes receiving a product transit time preference, and
wherein, in response to the receiving of the product of product transit time preference, the generating of the optimized route minimizes a time from when the consumable products are picked up to the time of arrival at the final destination.

5. The method of claim 1, wherein obtaining an estimated wait time for each drive-through facility further comprises obtaining a wait time derived from historical data.

6. An electronic communication device comprising:
a processor;
a memory coupled to the processor, the memory containing instructions, that when executed by the processor, perform the steps of:
presenting a menu comprising an option corresponding to a minimum journey time, an option corresponding to a minimum product acquisition time, and an option corresponding to a minimum product transit time;
receiving a selection of the option corresponding to the minimum product transit time;
receiving a selection, of the option corresponding to the minimum product acquisition time, as a secondary factor;
receiving a final destination;
receiving drive-through criteria for an intermediate location, wherein the drive-through criteria includes selection of a consumable product;
identifying a plurality of drive-through facilities that meet the received drive-through criteria;
obtaining an estimated wait time for each drive-through facility in the set of drive-through facilities using real-time wait-time data crowdsourced from customers of each drive-through facility; and
responsive to receiving the final destination and the drive-through criteria, generating an optimized route that passes along a drive through facility, selected from the plurality of drive-through facilities, that minimizes a time from when a consumable product is picked up to a time of arrival at the final destination based on the final destination, the drive-through criteria, and the estimated wait time of each drive-through facility in the set of drive-through facilities, such that a temperature variance of the consumable product between the time from when the consumable product is picked up to the time of arrival at the final destination is minimized.

7. The device of claim 6, wherein the memory further comprises instructions, that when executed by the processor, perform the step of receiving drive-through criteria including a brand name.

8. The device of claim 7, wherein the memory further comprises instructions, that when executed by the processor, perform the step of receiving drive-through criteria including a consumable product category.

9. The device of claim 7, wherein the memory further comprises instructions, that when executed by the processor, perform the steps of:
receiving a product transit time preference, wherein, in response to a receipt of the product of product transit time preference, the generating of the optimized route minimizes a time from when the consumable products are picked up to the time of arrival at the final destination.

10. The device of claim 7, wherein the estimated wait time is further derived from historical data.

11. A computer program product for a factoring drive-through wait times to optimize a travel route, for an electronic computing device comprising a computer readable storage medium having program instructions embodied therewith, the program instructions executable by a processor to cause the electronic computing device to:
present a menu comprising an option corresponding to a minimum journey time, an option corresponding to a minimum product acquisition time, and an option corresponding to a minimum product transit time;
receive a selection of the option corresponding to the minimum product transit time;
receiving a selection, of the option corresponding to the minimum product acquisition time, as a secondary factor;
receive a final destination;
receive drive-through criteria for an intermediate location, wherein the drive-through criteria includes selection of a consumable product;
identify a plurality of drive-through facilities that meet the received drive-through criteria;
obtain an estimated wait time for each drive-through facility in the set of drive-through facilities using real-time wait-time data crowdsourced from customers of each drive-through facility; and
responsive to receiving the final destination and the drive-through criteria, generate an optimized route that passes along a drive through facility, selected from the plurality of drive-through facilities, that minimizes a time from when a consumable product is picked up to a time of arrival at the final destination based on the final destination, the drive-through criteria, and the estimated wait time of each drive-through facility in the set of drive-through facilities, such that a temperature variance of the consumable product between the time from when the consumable product is picked up to the time of arrival at the final destination is minimized.

12. The computer program product of claim 11, wherein the computer readable storage medium includes program instructions executable by the processor to cause the electronic computing device to receive drive-through criteria including a consumable product category.

13. The computer program product of claim 12, wherein the computer readable storage medium includes program instructions executable by the processor to cause the electronic computing device to receive a product transit time preference, wherein, in response to a receipt of the product of product transit time preference, the generating of the optimized route minimizes a time from when the consumable products are picked up to the time of arrival at the final destination.

14. The computer program product of claim 11, wherein the estimated wait time is further derived from historical data.

\* \* \* \* \*